(12) United States Patent
Higono et al.

(10) Patent No.: US 6,980,415 B2
(45) Date of Patent: Dec. 27, 2005

(54) ELECTROLYTE FOR ELECTRICAL DOUBLE LAYER CAPACITOR AND ELECTRICAL DOUBLE LAYER CAPACITOR USING THE ELECTROLYTE

(75) Inventors: Takashi Higono, Wako (JP); Kenji Sato, Wako (JP); Noriko Suga, Haga-gun (JP); Kazumi Chiba, Shibukawa (JP); Teruaki Kamei, Shibukawa (JP)

(73) Assignees: Honda Motor Co., Ltd., Tokyo (JP); Japan Carlit Co., Ltd., Tokyo (JP)

( * ) Notice: Subject to any disclaimer, the term of this patent is extended or adjusted under 35 U.S.C. 154(b) by 0 days.

(21) Appl. No.: 11/091,752

(22) Filed: Mar. 29, 2005

(65) Prior Publication Data

US 2005/0219798 A1 Oct. 6, 2005

(30) Foreign Application Priority Data

Mar. 31, 2004 (JP) .............................. 2004-103443

(51) Int. Cl.$^7$ .............................................. H01G 9/02
(52) U.S. Cl. ..................... 361/504; 361/502; 252/62.2; 252/500
(58) Field of Search ............................... 361/502, 503, 361/511–512, 524–525; 29/25.03; 252/500, 252/62.2

(56) References Cited

U.S. PATENT DOCUMENTS 5,953,204 A * 9/1999 Suhara et al. ............... 361/502
6,038,123 A * 3/2000 Shimodaira et al. ........ 361/502
6,579,327 B1 * 6/2003 Shiue et al. ................ 29/25.03

FOREIGN PATENT DOCUMENTS

JP        2000-114105        4/2000

\* cited by examiner

Primary Examiner—Anthony Dinkins
(74) Attorney, Agent, or Firm—Oblon, Spivak, McClelland, Maier & Neustadt, P.C.

(57) ABSTRACT

An electrolyte for an electrical double layer capacitor and an electrical double layer capacitor using the electrolyte are disclosed. The electrolyte has a low coefficient of viscosity, high conductivity, and high withstand voltage, and excels in long term reliability.

The electrolyte for an electrical double-layer capacitor comprises a dimethyl carbonate and a compound of the following formula (1),

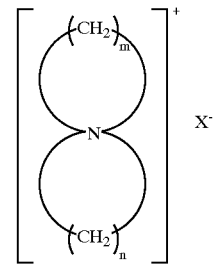

(1)

wherein, m and n individually represent a natural number of 3-7, and X is a counter anion.

5 Claims, 2 Drawing Sheets

ELECTROLYTE FOR ELECTRICAL DOUBLE LAYER CAPACITOR AND ELECTRICAL DOUBLE LAYER CAPACITOR USING THE ELECTROLYTE

BACKGROUND OF THE INVENTION

1. Field of the Invention

The present invention relates to an electrolyte for an electrical double layer capacitor, and in particular, to an electrolyte for an electrical double layer capacitor possessing excellent withstand voltage and excelling in long term reliability and to an electrical double layer capacitor using the electrolyte.

2. Description of Background Art

An electrical double layer capacitor is a charge accumulation device comprising an electrical double layer formed from the interface of polarizable electrodes and an electrolyte.

When the electrolyte used in an electrical double layer capacitor possesses a high coefficient of viscosity or a low degree of conductivity, the internal resistance of the electrical double layer capacitor as a whole increases thereby decreasing the voltage of the capacitor during charging and discharging. Therefore, an electrolyte used in an electrical double layer capacitor is required to possess a low coefficient of viscosity and a high degree of conductivity. Also, since an electrical double layer capacitor is used in a sealed state for an extended period of time and is charged and discharged repeatedly, the electrolyte used in the capacitor is required to possess long term durability. Furthermore, in order to ensure durability of the electrolyte, the operating voltage of conventional electrical double layer capacitors has been limited to 2–2.7 V. An electrolyte for use in an electrical double layer capacitor that can be operated at a higher voltage has been desired.

Conventionally, in view of ensuring long term durability, electrolytes for use in electrical double layer capacitors comprise a tetraalkyl ammonium salt such as triethylmethylammonium tetrafluoroborate (hereinafter referred to as "TEMA-BF4") dissolved in a cyclic carbonate such as propylene carbonate (hereinafter referred to as "PC") (Japanese Patent Application Laid-open No. 2000-114105).

However, due to a high coefficient of viscosity of about 2 mPa·s at 30° C. possessed by cyclic carbonates such as PC, there has been a problem of the coefficient of viscosity increasing even more when tetraalkyl ammonium salts are dissolved in these cyclic carbonates. Furthermore, the low conductivity of these electrolytes increases the internal resistance of the electrical double layer capacitor.

On the other hand, since electrolytes obtained from linear carbonates have a low coefficient of viscosity as compared with those obtained from cyclic carbonates such as PC, the use of electrolytes possessing long term durability obtained from these linear carbonates has been anticipated.

However, tetraalkyl ammonium salts such as TEMA-BF4 generally have a low solubility in linear carbonates. Therefore, a capacitor possessing the benefits obtained from the use of a linear carbonate has yet to be realized.

In view of the above, the object of the present invention is to provide an electrolyte for use in an electrical double layer capacitor operating at a high voltage that has a low coefficient of viscosity, is highly conductive, and is excellent in long term reliability, and to provide an electrical double layer capacitor using the electrolyte.

SUMMARY OF THE INVENTION

As a result of diligent research concerning an electrolyte for an electrical double layer capacitor, the present inventors have discovered that dimethyl carbonate, which is a linear carbonate, can dissolve a specific spiro compound at a high concentration, and that the resulting solution has a low coefficient of viscosity and can be used as an electrolyte for an electrical double layer capacitor excelling in conductivity, thereby completing the present invention.

Therefore, the present invention provides an electrolyte for an electrical double layer capacitor comprising a dimethyl carbonate and a compound of the following formula (1),

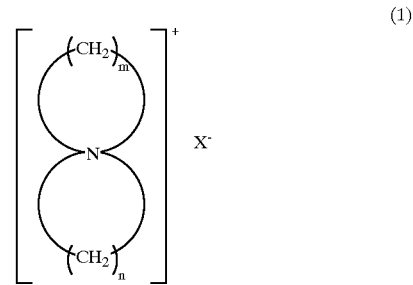

wherein, m and n individually represent a natural number of 3-7, and X⁻) is a counter anion.

The present invention also provides an electrical double layer capacitor using this electrolyte.

DETAILED DESCRIPTION OF THE INVENTION

Figure 1:
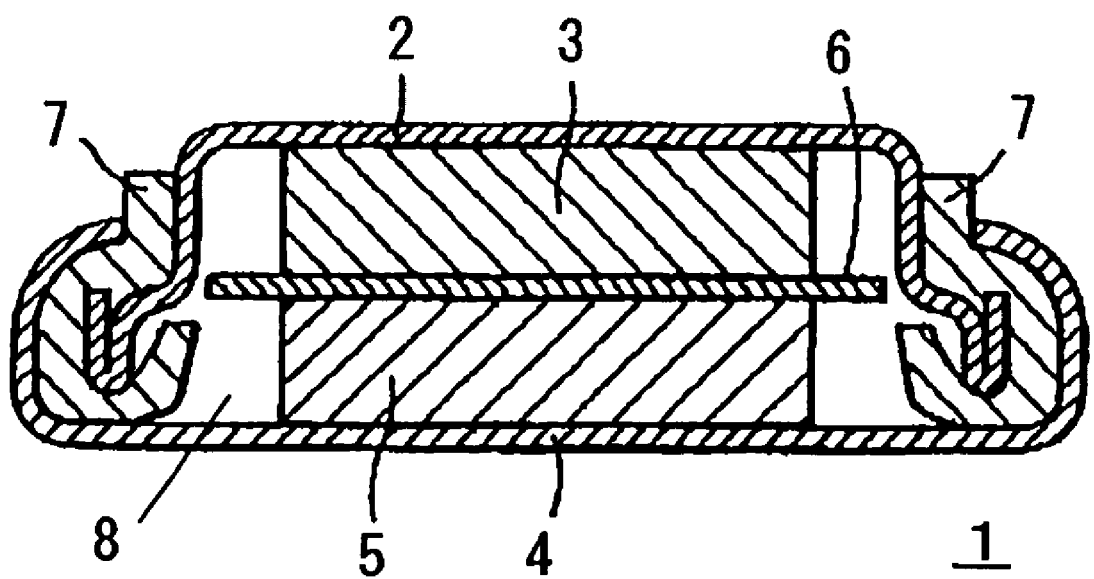
FIG. 1 illustrates a cross-sectional view of the structure of the electrical double layer capacitor.

The electrolyte for an electrical double layer capacitor of the present invention (hereinafter referred to as "electrolyte") comprises at least a dimethyl carbonate (hereinafter referred to as "DMC") and the spiro compound shown by the above formula (1) (hereinafter referred to as "spiro compound (1)").

Although there are no restrictions to the spiro compound (1) used in the present invention as long as the Spiro compound (1) sufficiently dissolves in DMC, m and n in the formula (1) preferably individually represent a natural number of 4-6, and particularly preferably individually represent a natural number of 4-5. As specific examples of the spiro compound (1), spiro-(1,1')-bipyrrolidinium, spiro-(1,1')-bipiperidinium, and the like can be given.

There are no restrictions to the counter anion for X⁻ in the spiro compound (1) as long as the spiro compound (1) sufficiently dissolves in DMC. Examples of the counter anion include a tetrafluoroboric acid anion, hexafluorophosphoric acid anion, perchloric acid anion, bistrifluoromethane sulfonimide anion, and the like. Of these, tetrafluoroboric acid anion is particularly preferable.

Of the compounds shown by the above formula (1), spiro-(1,1')-bipyrrolidinium tetrafluoroborate (hereinafter referred to as "SBP-BF4") shown by the formula (2) is particularly preferable due to its high solubility in DMC thereby allowing production of a high concentration of an electrolyte possessing a low coefficient of viscosity and high conductivity.

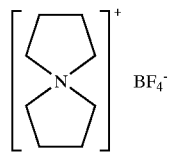

(2)

The electrolyte of the present invention comprises DMC and the above spiro compound (1) as essential components. Although there are no restrictions to the amount (concentration) of the spiro compound (1) in relation to the total amount of the electrolyte, the electrolyte preferably comprises the spiro compound (1) at a concentration of 1-3 mol/l. Furthermore, in order to obtain high conductivity, the concentration of the spiro compound (1) is preferably 0.5–1 times that of the saturated solution at room temperature. In particular, when SBP-BF4 is used as the Spiro compound (1), SBP-BF4 is preferably included at a concentration of 1.7–2.2 mol/l of the total amount of the electrolyte.

In the preparation of the electrolyte of the present invention, if necessary, an auxiliary solvent may be used in addition to the essential component DMC. As the auxiliary solvent, cyclic carbonates such as ethylene carbonate and propylene carbonate, lactones such as γ-butyrolactone and γ-valerolactone, nitrites such as acetonitrile and propionitrile, sulfones such as sulfolane, and the like can be given. These auxiliary solvents are used in an amount that does not decrease the solubility of the compound of the formula (1) and the coefficient of viscosity of the electrolyte. The auxiliary solvents are used together with the DMC preferably in an amount of 0–99 parts by weight, more preferably 0–50 parts by weight, and particularly preferably 20–40 parts by weight for 100 parts by weight of the DMC.

An electrical double layer capacitor is appropriately manufactured using the electrolyte obtained in the above manner. As an example of the electrical double layer capacitor, as shown in FIG. 1, an electrical double layer capacitor comprising a first electrode electrically connected to a first container, a second electrode electrically connected to a second container, and a diaphragm separating the first electrode and the second electrode, wherein the inside of the first container and the second container is filled with the electrolyte of the present invention and the first container and the second container are sealed with a nonconductive material to prevent electrical connection between the containers, can be given. The electrical double layer capacitor will now be described in detail using FIG. 1 as reference.

FIG. 1 is a cross-sectional view illustrating the electrical double layer capacitor of the present invention. In the figure, 1 represents an electrical double layer capacitor, 2 represents a first container, 3 represents a first electrode, 4 represents a second container, 5 represents a second electrode, 6 represents a diaphragm, 7 represents a nonconductive material, and 8 represents an electrolyte.

In the electrical double layer capacitor 1 of FIG. 1, the first container 2 and the first electrode 3 are electrically connected, and the second container 4 and the second electrode 5 are electrically connected. However, the first electrode 3 and the second electrode 5 are separated by the diaphragm 6. The first electrode 3 and the second electrode 5 are preferably arranged facing each other.

The first container 2 and the second container 4 are formed from a conductive material that will not corrode in the presence of the electrolyte 8, for example, aluminum and the like. On the other hand, even though the first electrode 3 and the second electrode 5 respectively electrically connected to the first container 2 and the second container 4 can be formed from any conductive material, a porous electrode having a large surface area is desirable. For example, a conductive material obtained by casting with a binder is preferably used as the electrode. As the conductive material, carbon material such as activated carbon powder and activated carbon fiber, noble metal oxide materials, and conductive polymer materials can be given, with carbon material being preferable because it is inexpensive. Furthermore, there are no restrictions to the material used for the diaphragm 6 placed between the first electrode 3 and the second electrode 5 to separate the electrodes, as long as the electrolyte can easily pass through the diaphragm, the degree of conductivity by electrons is low, and the material is chemically stable, for example, porous teflon, rayon paper, and the like may be suitably used.

The electrical double layer capacitor of the present invention is manufactured by filling the space between the above first container 2 and the second container 4 with the electrolyte 8 and sealing the containers with a nonconductive material 7 to prevent an electrical connection between the containers.

The above electrolyte is used as the electrolyte 8. The containers are filled with the electrolyte preferably by a method comprising vacuum drying the containers, injecting the electrolyte 8 into the containers inside a glove box filled with argon gas, and conducting aging. The vacuum drying is preferably conducted by heating at a temperature of 120–300° C. for about 5–100 hours, depending on the size of the capacitor. Aging is conducted to electrically decompose small amounts of impurities in the electrode by causing the ions to be adsorbed in the pore depths of a porous electrode made from activated carbon, for example, and is preferably conducted at room temperature for about 5–100 hours at a charge of 2–3 V. Finally, defoaming under reduced pressure is preferably conducted thereby completing the electrical double layer capacitor of the present invention.

In the electrical double layer capacitor 1 obtained in the above manner, the first electrode 3 and the second electrode 5 respectively on the inner sides of the first container 2 and the second container 4 are used for storing a charge, and the outer surfaces of the first container 2 and the second container 4 are respectively used as connection terminals for the first electrode 3 and second electrode 5.

Even though tetraalkylammonium salt has a low solubility in linear carbonate, the spiro compound (1) of the present invention has a high solubility in linear carbonate. Therefore, an excellent electrolyte and electrical double layer capacitor solving the problems of high viscosity and low conductivity can be obtained by the use of an electrolyte comprising DMC, which is a linear carbonate, and the spiro compound (1).

According to the present invention, an electrolyte for an electrical double layer capacitor having a low coefficient of viscosity and high conductivity and an electrical double layer capacitor using the electrolyte possessing a high withstand voltage and excelling in long term durability are provided. Moreover, operation of the capacitor at a higher voltage is also possible. The electrical double layer capacitor can be used for auxiliary power in electrical and hybrid vehicles.

EXAMPLES

The present invention will now be described in detail by way of examples, which should not be construed as limiting the present invention.

<Preparation of the Electrolyte for Electrical Double Layer Capacitor>

Example 1

127 g (1.0 mol) of dichlorobutane was added to 71 g (1.0 mol) of pyrrolidine and the mixture was reacted in the presence of 69 g (0.5 mol) of potassium carbonate at 85° C. for six hours to obtain 163 g of spiro-(1,1')-bipyrrolidinium chloride. An equivalent amount of tetrafluoroborate was added to the spiro-(1,1')-bipyrrolidinium chloride and a neutralization reaction was conducted at normal temperature for 30 minutes. The mixture was evaporated under reduced pressure to remove water and hydrogen chloride, thereby obtaining SBP-BF4.

The obtained SBP-BF4 was homogenously mixed with DMC at 30° C. so that the concentration of the SBP-BF4 was 2.0 mol/l of the total amount of the electrolyte to obtain an electrolyte (SBP-BF4/DMC).

Comparative Example 1

An electrolyte was prepared in the same manner as in Example 1, except for using TEMA-BF4 in place of SBP-BF4. However, since TEMA-BF4 has a low solubility thereby resulting only in a concentration of 0.004 mol/l, an electrolyte having a desired concentration of 2.0 mol/l could not be obtained.

Comparative Example 2

An electrolyte (TEMA-BF4/PC) comprising TEMA-BF4 at a concentration of 2.0 mol/l was prepared in the same manner as in Example 1, except for using TEMA-BF4 in place of SBP-BF4 and PC in place of DMC.

<Measurement of the Coefficient of Viscosity and Conductivity of the Electrolyte>

Measurement Example 1

The coefficient of viscosity of the electrolytes obtained in Example 1 and Comparative Example 2 at 30° C. was measured using a cone and plate viscometer (manufactured by Tokimec Inc.). The conductivity of the electrolytes at 30° C. was measured using an electrode-type conductivity meter (Yokogawa Electric Corporation). The results are shown in Table 1.

TABLE 1

| | Electrolyte composition | Coefficient of viscosity (mPa · s) | Conductivity (mS/cm) |
|---|---|---|---|
| Example 1 | SBP-BF4/DMC | 3.11 | 21.76 |
| Comparative Example 2 | TEMA-BF4/PC | 4.76 | 19.30 |

As shown above, since SBP-BF4 is highly soluble in DMC which has a low coefficient of viscosity, the preparation of an electrolyte with a concentration of 2.0 mol/l was possible. On the other hand, since TEMA-BF4 possesses a low solubility in DMC, an electrolyte with a concentration of 2.0 mol/l could not be obtained. The electrolyte of Example 1 (SBP-BF4/DMC) possessed a very low coefficient of viscosity and high conductivity as compared with the conventional electrolyte of Comparative Example 2 (TEMA-BF4/PC).

<Manufacture of Electrical Double Layer Capacitor>

Example 2

An electrical double layer capacitor 1 was manufactured by charging a container with the structure shown in FIG. 1 with the electrolyte prepared in Example 1. A conductive substance comprising activated carbon as a major component was mulled with a binder and formed into the shape of a disc to obtain the first electrode 3 and the second electrode 5, the first container 2 and the second container 4 were formed from aluminum, and the first electrode 3 and second electrode 5 were respectively attached to the first container 2 and the second container 4 using a conductive adhesive. The diaphragm 6 was formed from rayon paper.

A container comprising the above materials with the structure shown in FIG. 1 was vacuum dried at 150° C. for five hours, the electrolyte prepared in Example 1 was filled into the container inside a glove box filled with argon gas, the container was aged for five hours at a charge of 2.2 V, and the container was defoamed under reduced pressure to obtain the electrical double layer capacitor.

Comparative Example 3

An electrical double layer capacitor was prepared in the same manner as in Example 2 except for using the electrolyte obtained in Comparative Example 2 in place of the electrolyte obtained in Example 1.

<Measurement of Reaction Current Value for the Electrical Double Layer Capacitor>

Measurement Example 2

The withstand voltage of the electrolyte of Example 1 and the electrolyte of Comparative Example 2 were determined by sequentially increasing the voltage using a charge-discharge testing device and measuring the reaction current value resulting from decomposition of the electrolyte at each voltage increase.

Figure 2:
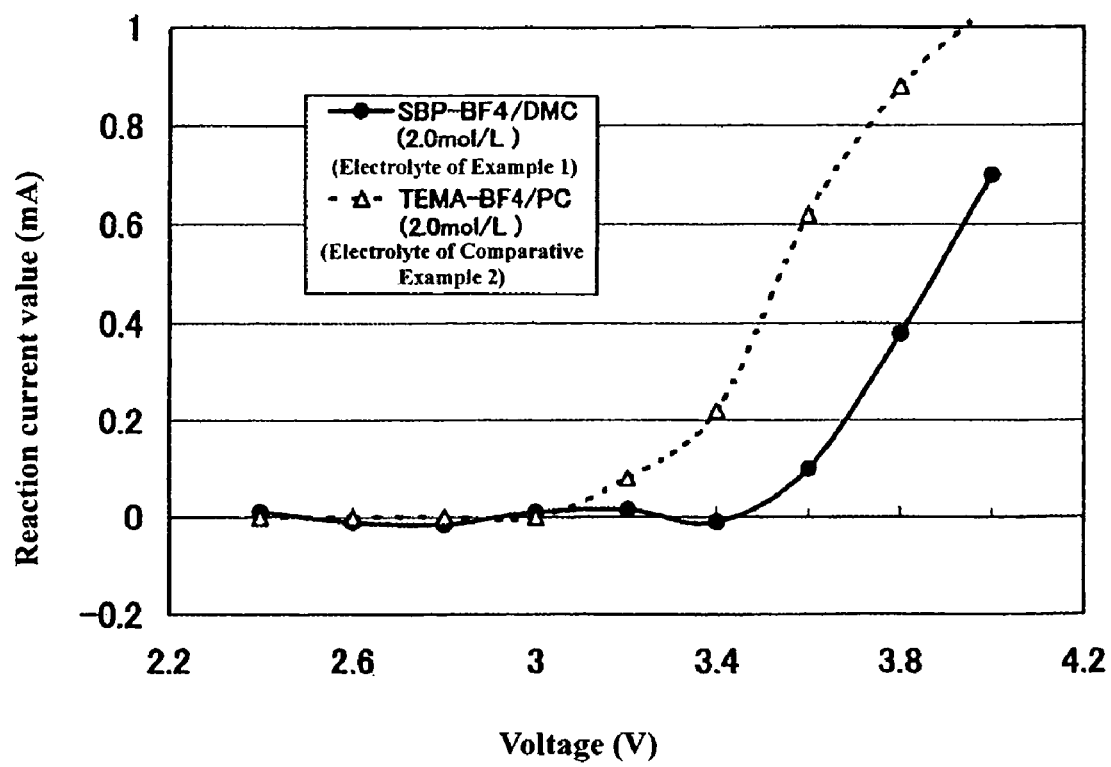
FIG. 2 is a graph showing the withstand voltage and reaction current value resulting from decomposition for the electrolyte of the present invention and a conventional electrolyte.

Specifically, after charging the capacitor to 2.4 V at a constant current at room temperature, the reaction current value resulting from electrolyte decomposition was measured after the capacitor maintained a charge of 2.4 V for two hours. Next, after discharging the capacitor at a constant current to a predetermined voltage (0.1 V) then charging the capacitor at a constant current to 2.6 V, the reaction current value when the capacitor maintained a charge of 2.6 V for two hours was measured. In the same manner, the voltage was sequentially increased to 4.0 V, 0.2 V each time, and the reaction current value at each voltage increase was measured. The voltage at which the reaction current value first exceeded 0.1 mA was taken as the withstand voltage value. The results are shown in FIG. 2 and Table 2. Although the electrical double layer capacitor is used at a voltage of about 2.5 V in practice, it is known that the higher the withstand voltage value, the better the long term durability of the capacitor is.

TABLE 2

| Electrical double layer capacitor | Electrolyte | Electrolyte composition | Withstand voltage (V) | Reaction current value at 3.6 V (mA) |
|---|---|---|---|---|
| Example 2 | Example 1 | SBP-BF4/DMC | 3.4 | 0.1 |
| Comparative Example 3 | Comparative Example 2 | TEMA-BF4/PC | 3.0 | 0.6 |

A reaction current did not occur in the electrical double layer capacitor manufactured in Example 2 when charged to 3.4 V. However, a reaction current did occur in the electrical double layer capacitor manufactured in Comparative Example 3 when charged over 3.0 V. The electrical double layer capacitor manufactured in Example 2 displayed a lower reaction current value in the entire voltage range.

As can be seen from the above results, the electrolyte of Example 1 (SBP-BF4/DMC) possessed a higher withstand voltage and more excellent long term durability as compared with the conventional electrolyte for electrical double layer capacitor (TEMA-BF4/PC). Furthermore, since a low reaction current value at a high voltage indicates that the capacitor can be operated at a high voltage with only a slight decrease in electrostatic capacity, the capacitor of Example 2 was proven to possess excellent long term durability.

INDUSTRIAL APPLICABILITY

According to the present invention, an electrolyte for an electrical double layer capacitor having a low coefficient of viscosity and a high degree of conductivity can be provided. Moreover, due to the high withstand voltage of the electrolyte in addition to the above properties, an electrical double layer capacitor possessing excellent long term durability can be provided.

Since the electrical double layer capacitor can be operated at a high voltage without a decrease in the electrostatic capacity, excels in long term durability, and can be charged and discharged quickly, the electrical double layer capacitor can be used in a wide range of applications including vehicles powered by electrical energy such as electrical and hybrid vehicles.

What is claimed is:

1. An electrolyte for an electrical double layer capacitor comprising a dimethyl carbonate and a spiro compound of the following formula (1),

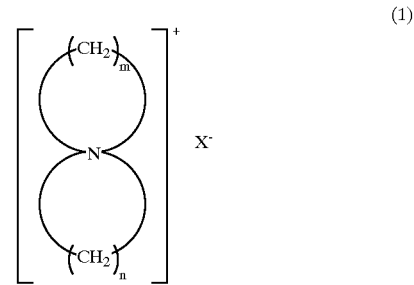

wherein, m and n individually represent a natural number of 3-7, and $X^-$ is a counter anion.

2. The electrolyte for an electrical double layer capacitor according to claim 1, wherein the spiro compound shown by the formula (1) is spiro-(1,1')-bipyrrolidinium tetrafluoroborate.

3. The electrolyte for an electrical double layer capacitor according to claim 2 comprising the spiro-(1,1')-bipyrrolidinium tetrafluoroborate at a concentration of 1.7–2.2 mol/l.

4. An electrical double layer capacitor using the electrolyte according to any one of claims 1–3.

5. An electrical double layer capacitor comprising a first container, a first electrode electrically connected to the first container, a second container, a second electrode electrically connected to the second container, and a diaphragm separating the first electrode and the second electrode, wherein the inside of the first container and the second container is filled with the electrolyte of any one of claims 1–3 and the first container and the second container are sealed with a nonconductive material to prevent electrical connection between the containers.

* * * * *